Jan. 10, 1950     S. P. GRUSKA     2,494,509
BOAT TRAILER
Filed Dec. 30, 1946
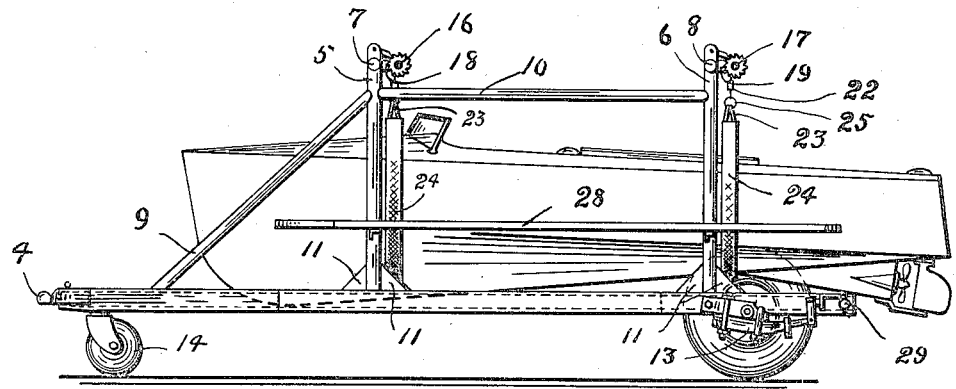
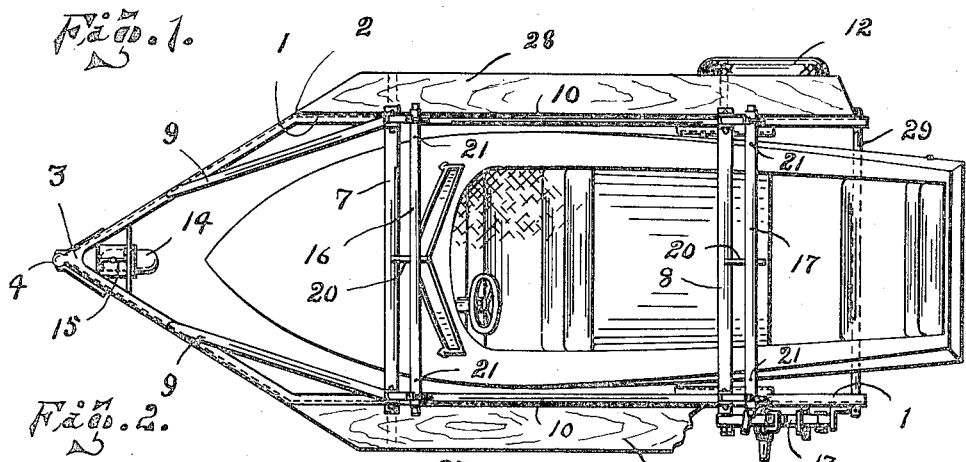
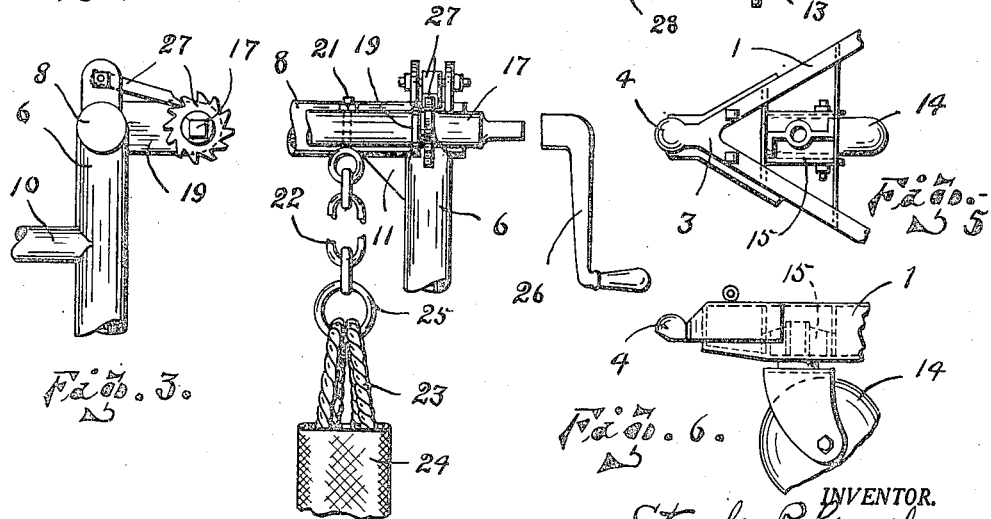
INVENTOR.
Stanley P. Gruska.
BY Geo Stevens
atty.

Patented Jan. 10, 1950

2,494,509

UNITED STATES PATENT OFFICE 2,494,509

BOAT TRAILER

Stanley P. Gruska, Hibbing, Minn.

Application December 30, 1946, Serial No. 719,280

2 Claims. (Cl. 214—75)

This invention relates to boat carrying trailers and has special reference to such a trailer adapted to transporting heavier small boats and small launches.

One of the principal objects of this invention is to provide a simple sturdy and durable trailer for transporting such boats and one that is light in weight so that an ordinary car may easily tow same.

Another object is to provide such a trailer whereby the loading or unloading may be accomplished in the water thereby eliminating all unnecessary lifting and shoving and the like by the person or persons handling same and also eliminating the danger of damaging the boat in so doing.

Another object is to provide such a trailer with simple hoisting and lowering means whereby a heavy boat may easily be loaded for transportation.

Still another object is to so suspend and distribute the weight being carried as to prevent the undesirable swaying of the trailer as it is being towed at relatively high speeds.

Other objects and advantages will appear as the description of the invention progresses.

Referring now to the accompanying drawing forming part of this application:

Fig. 1 is a side elevational view of one of the trailers having a boat suspended therein except that the rear wheel of the trailer is omitted for convenience of exhibiting the parts.

Fig. 2 is a top plan view of Fig. 1 with a portion of the rear running board broken away.

Fig. 3 is an enlarged fragmental end elevation of the pawl and ratchet winding shaft connection.

Fig. 4 is a similar view at right angles to Fig. 3 illustrating the crank and sling attachments of the winding shafts.

Fig. 5 is a top plan view of the trailer head and pilot wheel.

Fig. 6 is a side elevational view of Fig. 5.

In the drawing the reference numerals 1—1 indicate the channel iron side frame members which form the base of the trailer. The side members 1—1 are bent sharply at 2—2 to unite at 3 where any suitable trailer hitch 4 is installed for towing the ultimately completed trailer. Fixed to the side members 1—1 are the pairs of uprights standards 5 and 6, they being joined at their upper ends by the transverse cross bars 7 and 8, respectively.

To complete the simple rigid skeleton frame, the forwardly inclined braces 9—9 and the longitudinal braces or stringers 10—10 are provided to give the necessary longitudinal strength to the structure. In this instance all of the joints between side members, standards and cross bars are welded and provided with the gusset plates 11 which add the finishing touch of strength and rigidity while maintaining a minimum of weight in the structure.

It is apparent from the above that the skeleton frame of the trailer is open downwardly and rearwardly thereof to permit of the loading or unloading a boat from that direction.

The above described frame is carried upon a pair of wheels 12 which are rotatably carried on the spring members 13 mounted on the side members 1—1. This being a well known construction, it needs no further detailed explanation here. To facilitate the moving of the trailer without the aid of a motor vehicle for carrying the front end thereof as by the trailer hitch 4, there is installed intermediate of the side members 1—1 adjacent the front 3 thereof a pilot wheel 14 temporarily journaled within the head frame structure 15 which ably supports the front of the trailer when it is not attached to a vehicle and permits of ready moving and turning of the trailer manually when so desired, as for example, in moving the boat and trailer down the beach and into the water for unloading. This caster wheel is removed when the trailer is to be towed by merely raising the front end of the trailer from same.

To faciiltate the loading and unloading of the heavier boats for which the trailer is designed, there is provided suitable winding shafts 16 and 17 which are rotatably carried by the brackets 18 and 19 and extend parallel to the cross bars 7 and 8 respectively, there being an auxiliary bracket 20 centrally of each shaft to provide a central bearing therefor. Fixed through said shafts 16 and 17 adjacent the brackets 18 and 19 are the eye bolts 21 to each of which is attached a short length of chain 22. A sling comprising a double loop of suitable rope 23 rove through a suitable protecting tube 24, such as fire hose or the like, is fixed to a ring 25 in the chain 22, whereby the winding of the shafts 16 and 17, as by the removable crank 26, will serve to either lower the boat from its carrying position, as shown, into the water after the trailer has been backed into the same to a suitable depth, or to raise the boat from the water to carrying position as desired. The shafts 16 and 17 are equipped with pawl and ratchet means as indicated at 27 to maintain same in their desired position.

It is apparent that the shafts 16 and 17 are independent of one another, and that they must be wound separately, either alternately or simultaneously in order to raise or lower the boat evenly.

A novel feature of the trailer is the provision of a running board 28—28 which absorbs much of the dirt thrown up by the wheels of the trailer while traveling along road ways and also functions as a most convenient dock for handling the boat and winding mechanisms when the trailer is in the water during the loading or unloading process.

To insure positive stability for the trailer frame while being towed behind a vehicle, the removable brace 29 is provided between the rearmost ends of the side members 1—1, it being removed, of course, in loading or unloading a boat.

Having thus described my invention, what I claim is:

1. A boat trailer comprising a wheel supported skeleton frame opening downwardly and rearwardly to receive a boat from that direction; said frame including spaced opposed side members bent adjacent the front thereof to form a pointed trailer hitch receiving front; two pairs of upright standards vertically fixed at their lower ends to said side members, one pair adjacent the rear end of said side members and one pair just rearwardly of said bent portion; a horizontal transverse bar fixed across the upper ends of each pair of said standards; a winding shaft rotatably carried by each of said transverse bars; and a boat carrying sling pendant from each of said shafts and vertically adjustable thereby.

2. A boat trailer comprising a wheel supported skeleton frame opening downwardly and rearwardly to receive a boat from that direction; said frame including spaced opposed side members bent adjacent the front thereof to form a pointed trailer hitch receiving front; two pairs of upright standards vertically fixed at their lower ends to said side members, one pair adjacent the rear end of said side members and one pair fixed adjacent said bent portion; an inclined brace extending downwardly from the upper end of each of the foremost of said standards to said side members adjacent said hitch; a pair of horizontal stringers connecting said pairs of standards near the upper ends thereof; a transverse bar fixed transverse the upper ends of said pairs of standards; a winding shaft rotatably carried by each of said transverse bars; and a boat carrying sling pendant from each of said shafts and vertically adjustable thereby.

STANLEY P. GRUSKA.

REFERENCES CITED

The following references are of record in the file of this patent:

UNITED STATES PATENTS

| Number | Name | Date |
|---|---|---|
| 1,531,180 | Erickson | Mar. 24, 1925 |
| 1,609,625 | Lawes | Dec. 7, 1926 |
| 2,260,676 | Lafaye, Sr. | Oct. 28, 1941 |
| 2,361,951 | Livermon | Nov. 7, 1944 |
| 2,415,771 | Van Agtmael | Feb. 11, 1947 |
| 2,425,252 | Larson | Aug. 5, 1947 |
| 2,427,667 | Gilbert | Sept. 23, 1947 |